US008558715B2

(12) United States Patent
Lien et al.

(10) Patent No.: US 8,558,715 B2
(45) Date of Patent: Oct. 15, 2013

(54) CONTAINER WITH INTERNALLY EMITTED AUDIO

(75) Inventors: Timothy J. Lien, Lenexa, KS (US); Gerald J. Holland, Kansas City, MO (US); Robert E. Morley, Raymore, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 275 days.

(21) Appl. No.: 13/183,925

(22) Filed: Jul. 15, 2011

(65) Prior Publication Data

US 2013/0015193 A1   Jan. 17, 2013

(51) Int. Cl.
*G08B 3/00* (2006.01)

(52) U.S. Cl.
USPC ........................................ 340/691.1; 340/692

(58) Field of Classification Search
USPC ............. 340/691.1, 692, 686, 384.7, 693.5, 340/686.1; 215/200, 400, 294, 295, 296, 215/355, 356, 376; 220/694, 655, 656, 916
See application file for complete search history.

(56) References Cited

U.S. PATENT DOCUMENTS

| 2,929,290 | A | 3/1957 | Smith |
| 3,878,507 | A | 4/1975 | Medlock |
| 5,464,092 | A | 11/1995 | Seeley |
| 5,575,383 | A | 11/1996 | Seeley |
| 5,990,790 | A | 11/1999 | Lusareta |
| 6,024,625 | A | 2/2000 | Pearce |
| 6,335,691 | B1 | 1/2002 | Bird |
| 6,398,050 | B1 * | 6/2002 | Allora ........................... 215/228 |
| 6,545,594 | B1 | 4/2003 | Knight et al. |
| 6,591,524 | B1 | 7/2003 | Lewis |
| 6,771,165 | B2 | 8/2004 | Burg, II et al. |

(Continued)

FOREIGN PATENT DOCUMENTS

| CA | 2688885 | 5/2011 |
| JP | 3145906 | 10/2008 |

OTHER PUBLICATIONS

Professor Hiroshi Ishii, Ali Mazalek, Jay Lee, Rich Fletcher, and Joe Paradiso, MIT Tangible Media Group, Music Bottles, http://tangible.media.mit.edu/projects/musicbottles, dated Oct. 12, 2010, pp. 1-3.

(Continued)

*Primary Examiner* — Toan N Pham
(74) *Attorney, Agent, or Firm* — Shook, Hardy & Bacon L.L.P.

(57) ABSTRACT

A container having an internally directed audible output actuated by removal of a stopper is described. The container includes a hollow body with an open mouth and a base that includes a speaker and control electronics. A sensor is provided that is configured to detect presence of the stopper in the open mouth of the container. In one embodiment the sensor is comprised of a normally open electrical circuit formed by a pair of opposing arrays of electrical traces disposed within the mouth. In another embodiment, the sensor comprises an infrared light source and sensor that detects an amount of internally reflected infrared light within walls of the body. In yet another embodiment, the sensor comprises a device which detects the presence and/or absence of a magnetic field. Upon detection of removal of the stopper, an audible output is produced by the speaker into the container body and is perceivable by nearby users.

20 Claims, 7 Drawing Sheets

(56) References Cited

U.S. PATENT DOCUMENTS

| | | |
|---|---|---|
| 6,778,813 B1 | 8/2004 | Lilly |
| 6,831,552 B2 | 12/2004 | Lin |
| 7,134,932 B1 | 11/2006 | Carrasco et al. |
| 2002/0077018 A1 | 6/2002 | Rice |
| 2007/0161325 A1 | 7/2007 | Brooks et al. |

OTHER PUBLICATIONS

Christmas in a Bottle (Snowman on a Beach) screenshot of online catalog, http://www.ibizznet.com/catalog/info/info_bottle_snowman_under_tree.htm., dated 2003.

Canadian Office Action mailed Feb. 12, 2013 in Application No. 2753014; 8 pages.

* cited by examiner

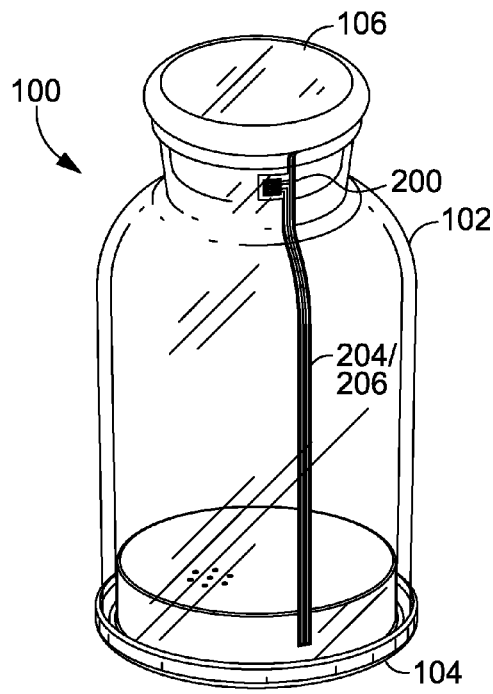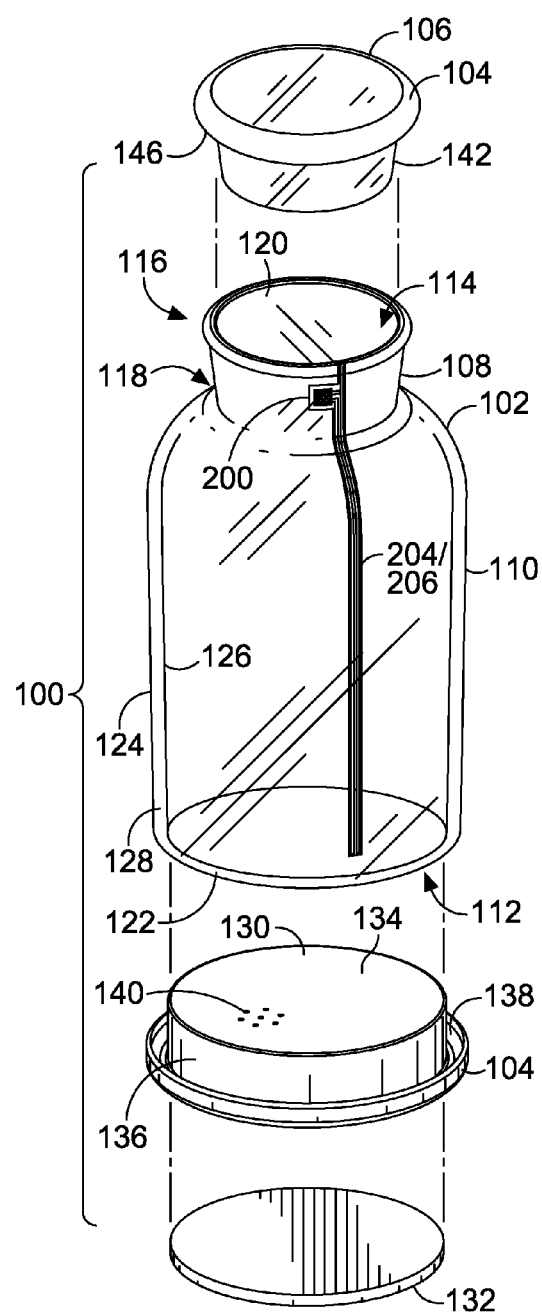
FIG. 1.
FIG. 2.

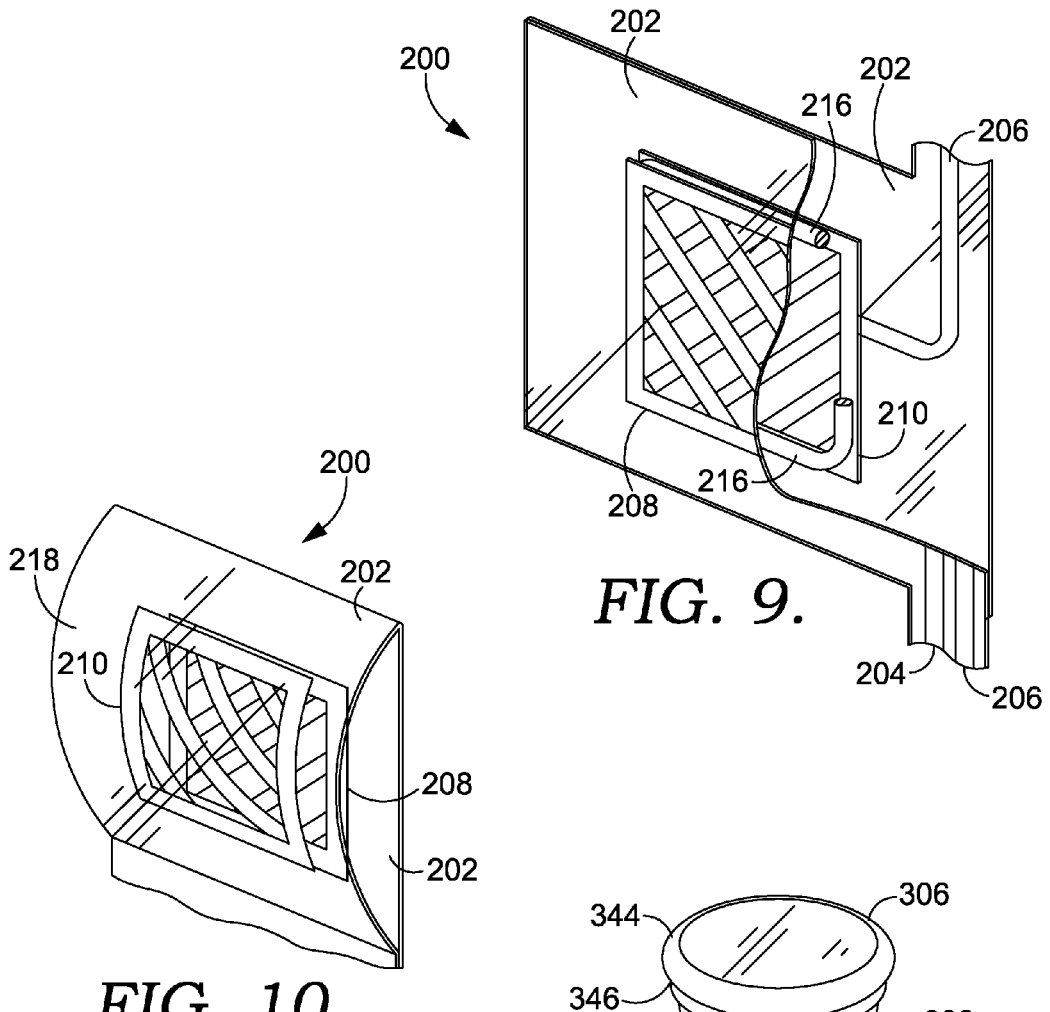
FIG. 9.
FIG. 10.
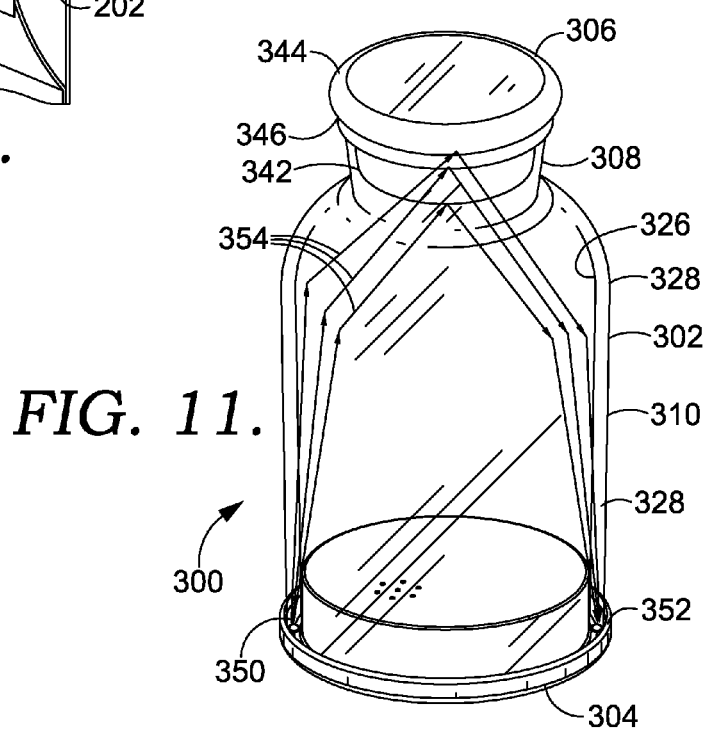
FIG. 11.

CONTAINER WITH INTERNALLY EMITTED AUDIO

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, apparatus comprising a container having a hollow body with an open mouth and an open bottom end. A base that includes a speaker and control electronics is disposed on the open bottom end of the body with the speaker directed inwardly toward the hollow body. A stopper configured to be removably received by the open mouth and a sensor that detects the presence of the stopper in the open mouth are also provided. As such, removal of the stopper from the mouth of the container is detected by the sensor and an audible output is generated by the speaker and directed into the hollow body. The audible output or sound includes, for example, a song or other audio file and may be perceived by a user adjacent to the container as the sound travels from the hollow body and out of the container through the open mouth. Upon reinsertion of the stopper into the mouth of the container, the sensor detects the presence of the stopper and the audible output ceases.

DESCRIPTION OF THE DRAWINGS

Illustrative embodiments of the invention are described in detail below with reference to the attached drawing figures, and wherein:

FIG. 1 is a perspective view of a container constructed in accordance with an embodiment of the invention;

FIG. 2 is a partially exploded view of the container of FIG. 1;

FIG. 9 is a perspective view of a sensor with a section removed to reveal underlying features in accordance with an embodiment of the invention;

FIG. 10 is a perspective view of a sensor in accordance with another embodiment of the invention;

FIG. 11 is a perspective view of a container depicting exemplary paths of light internally reflected along walls of the container in accordance with an embodiment of the invention;

DETAILED DESCRIPTION

Figure 3:
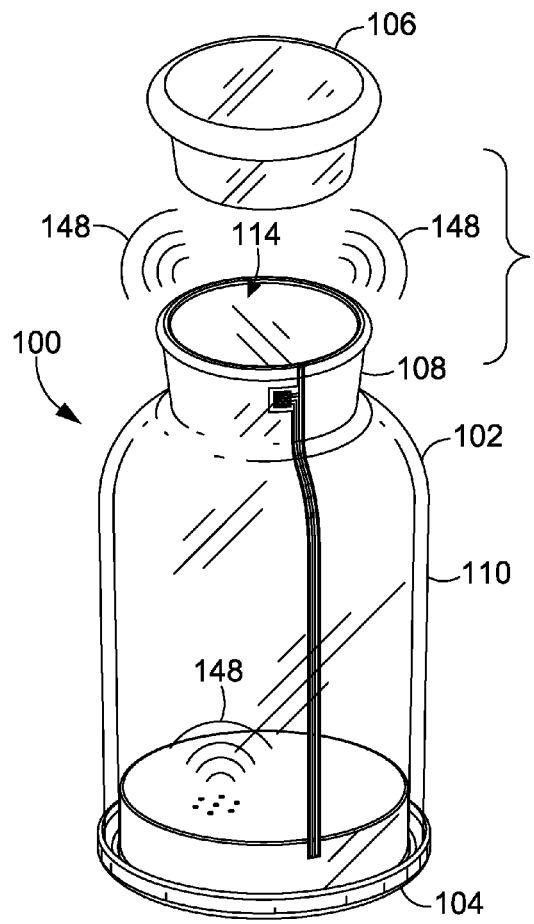
FIG. 3 depicts the container of FIG. 1 with a stopper removed and an audible output being emitted in accordance with an embodiment of the invention.
Figure 4:
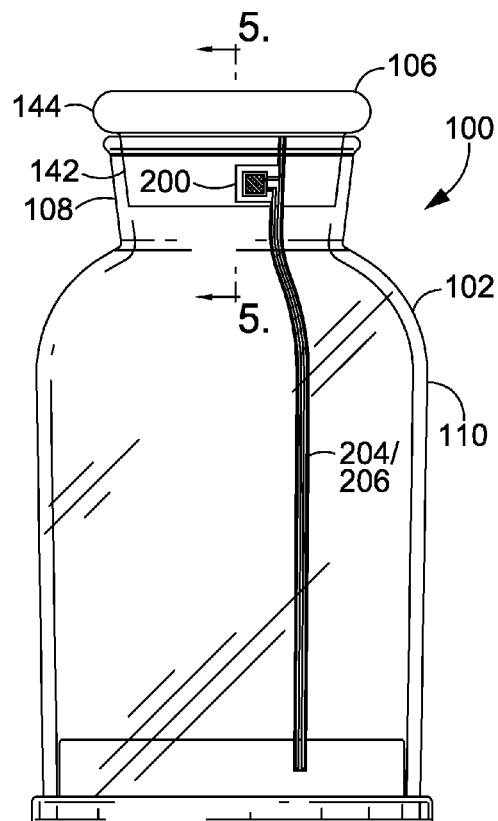
FIG. 4 is a side elevation view of the container of FIG. 1.
Figure 5:
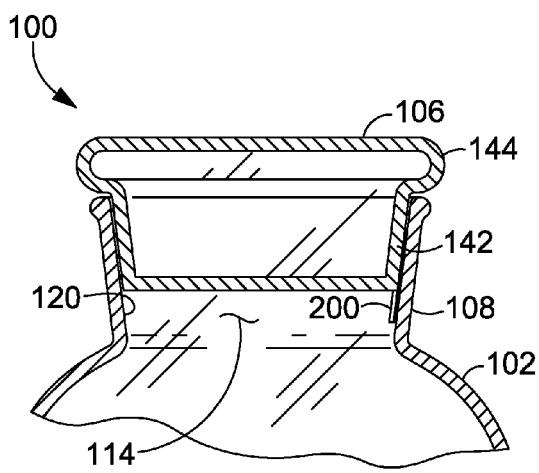
FIG. 5 is a fragmentary cross-sectional view of the container taken along the line 5-5 depicted in FIG. 4.
Figure 6:
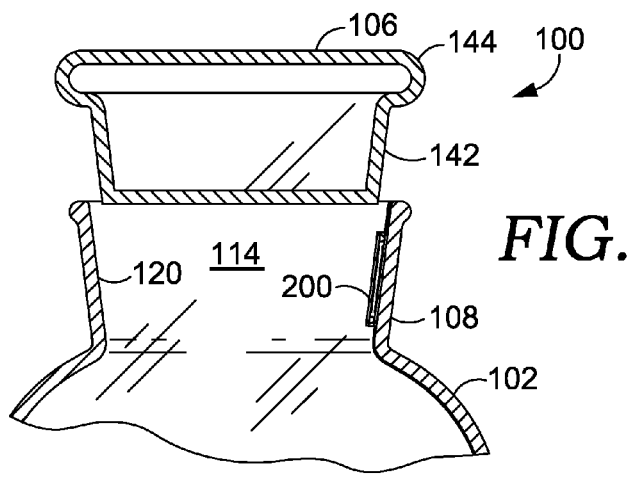
FIG. 6 is a view similar to FIG. 5, but depicting the stopper removed from the container.
Figure 7:
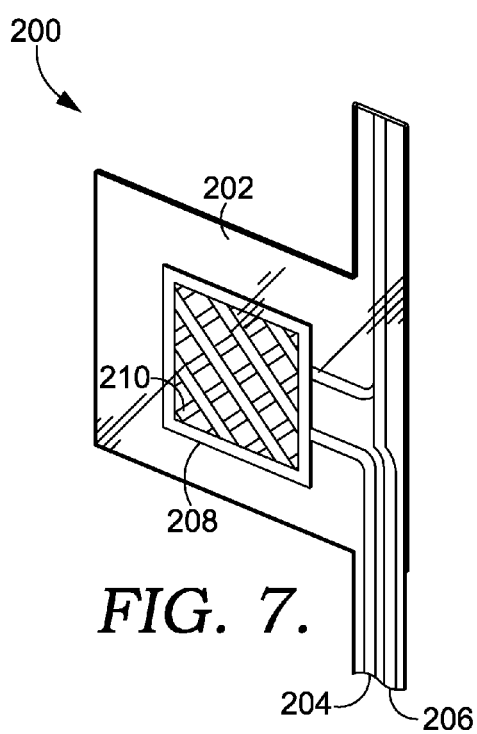
FIG. 7 is a perspective view of one possible embodiment of a sensor for use in accordance with the invention.

The subject matter of select embodiments of the invention is described with specificity herein to meet statutory requirements. The description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include containers configured to generate an audible output interior to the container and perceivable by users exterior to the container. In one embodiment, a container having a hollow body with an open mouth forming an aperture and an open bottom end is disclosed. The container also includes a base configured to be received by the open bottom end of the body. The base includes first and second surfaces; the first surface faces an interior of the body and the second surface faces opposite the first surface. The base has a speaker disposed therein which is directed to emit sound therefrom through the first surface and into the interior of the body. A stopper and a sensor are also included. The stopper is configured to be removeably received in the open mouth of the body to enclose the interior of the body. The sensor is configured to detect presence of the stopper within the mouth of the body. When removal of the stopper from the mouth of the body is detected by the sensor, the speaker is activated to generate an audible output or sound. When insertion of the stopper within the mouth of the body is detected by the sensor, the audible output ceases.

In another embodiment, a container comprising a hollow body, a base, a stopper, and a sensor is disclosed. The sensor is disposed on an interior surface of a mouth of the body and is configured to detect presence of the stopper within the mouth of the body. The sensor includes a flexible substrate with first and second electrically conductive arrays disposed thereon. The flexible substrate is foldable to place the first and second arrays in opposition in spaced apart, generally parallel planes. The second array is biased apart from the first array to provide a normally open circuit between the first and second arrays.

In another embodiment, a container comprising a hollow body, a base, and a stopper are described. An infrared light source is disposed in the base and configured to emit infrared light into a wall of the body by internal reflection. An infrared light detector is also disposed in the base and is configured to receive infrared light emitted by the source into the wall of the body.

Referring now to the figures and to FIGS. 1-6 in particular, a container 100 configured to generate an audible output interior to the container that is perceivable by users exterior to the container is described in accordance with an embodiment of the invention. The container 100 is depicted herein as an apothecary-style bottle however any desired container or bottle configuration is useable in embodiments of the invention. Such containers or bottles generally include a stopper as described herein or might include a screw-on cap, bottle cap, cork, or other closure. The closure can be reuseable to reseal the container or can be a designed for a single use. In an embodiment, the container 100 is configured to receive one or more items, such as keepsakes, mementos, souvenirs, pictures, notes, scrolls, or the like therein for storage and/or display.

The container includes a hollow body 102, a base 104, and a stopper 106. The hollow body 102 includes a neck 108, a generally cylindrical section 110, and an open bottom end 112. The neck 108 forms an open mouth 114 at a first end 116 and connects to the cylindrical section 110 at a second end 118. An interior wall 120 of the neck 108 is configured to receive the stopper 106, as described more fully below, and may assume a slight inward angle or taper. One or more features, such as for example ribs, flanges, protuberances, gaskets, and o-rings, may be incorporated into the interior wall 120 or disposed thereon to provide coupling with the stopper 106 and/or to create a seal therebetween.

The cylindrical section 110 of the body 102 extends from the second end 118 of the neck 108 to the open bottom end 112. Although depicted in the figures as having a generally cylindrical shape, the cylindrical section 110 can have any desired shape, size, form, or dimensions desired. The open bottom end 112 is may be formed by cutting an end off of the container 100 or by manufacturing the body 102 without an enclosed end. By either manufacturing method, one or more additional process such as deburring or polishing an edge 122 of the body 102 may be provided.

The body 102 may be composed of a glass, plastic, or other similar material or combination thereof. The body 102 is at least partially transparent or translucent and may have one or more portions that are opaque. In one embodiment, the body 102 may even be opaque. Additionally, one or more labels, images, decorations, or other features may be applied to an exterior or interior surface 124, 126 of the body 102 using adhesives, printing, painting, etching, or other process. Alternatively or in addition, such features might be formed integral to a wall 128 of the body 102. In an embodiment, the wall 128 of the cylindrical section 110 may include a hollow area (not shown) between the interior 126 and exterior 124 surfaces in which one or more decorative items might be disposed.

The base 104 includes a top surface 130 and a bottom surface 132 between which is disposed one or more of a speaker, a power source, and a control circuit with associated electronic components (not shown). The top surface 130 includes a circular central section 134 configured to be received within the cylindrical section 110 of the body 102. The central section 134 is surrounded by an annular wall 136 that extends from the perimeter of the central section 134 toward the bottom surface 132 a distance and then extends radially outward before returning in an opposite direction, away from the bottom surface 132, to form an annular channel 138 around the perimeter of the base 104.

The channel 138 has sufficient dimensions to accept at least a portion of the edge 122 of the cylindrical section 110 of the body 102, as illustrated in FIG. 1. The channel 138 may include one or more features for mechanically coupling to the body 102 such as tabs, ribs, gaskets, or the like. Alternatively, or in addition, the base 104 might be coupled to the body 102 using one or more adhesives, glues, welding, or other attachment means. The top surface 130 also includes a plurality of apertures 140 associated with a speaker disposed within the base 104 to allow audible outputs therefrom to more readily pass through the top surface 130 and into the interior of the hollow body 102 of the container 100.

The speaker, power source, control circuit, and other associated components are similar to those known in the art. For example, in an embodiment the speaker is similar to that employed in greeting cards with incorporated audible outputs; however, any speaker or speaker technology is useable in embodiments of the invention. It is recognized that a variety of components and configurations thereof are identifiable in the art and may be incorporated in embodiments of the invention without departing from the scope described herein. Such components and configurations are understood as being disclosed herein and as such are not described in further detail.

Further, while the container is described so far herein as having an audible output, other or additional outputs are within the scope of the present invention. For example instead of, or in addition to, the audible output occurring upon detection of the removal of the stopper from the mouth of the container, other sensory effects such as light, video, motion, and/or scent may be activated.

In an embodiment, one or more computer-readable memories are provided in association with the control circuit for storing data useable to produce an audible output by the speaker. The data may be stored permanently or temporarily and may be re-writeable. As such, a recording may be stored in the memory and played back by the control circuit via the speaker. In an embodiment, the recording is a pre-recorded content (such as a song) and is stored during manufacture of the container. In another embodiment, the recording is recorded by a user (such as a verbal greeting) and stored in the memory for later playback. In yet another embodiment, the recording may be transferred to the memory from another device. In such an embodiment, the user may transfer or load a different pre-recorded sound or sounds (songs or other audio) into the memory via a wired or wireless data connection. One possible standard wired connection is a USB connection, where the base 104 includes a data port (not shown). In any embodiment, the recording comprises any audible sounds including, for example and not limitation, spoken words, songs, music, sound effects, combinations thereof, and the like.

The bottom surface 132 of the base 102 is configured to couple to the top surface 134 to enclose the speaker, power source, control circuit, and any other associated components. The bottom surface 132 may also provide access to a power switch, a record button and/or other functional components of the container, a microphone, and a battery compartment, among other components.

The base 104 is constructed from any desired materials. Such materials include, for example, plastics such as polystyrene or acrylonitrile butadiene styrene (ABS), glass, metals, or combinations thereof, among others.

The stopper 106 includes a plug end 142 and a graspable portion 144. The plug end 142 has suitable dimensions to be removably received by the mouth 114 of the body 102. In an embodiment, the plug end 142 has a truncated cone configuration with a taper matching that of the interior wall 120 of the neck 108 such that the plug end 142 mates with the interior wall 120 to generally seal the interior of the container 100 when the stopper 106 is inserted into the mouth 114 of the container 100. In another embodiment, the plug end 142 is formed from an at least partially flexible material or has an at least partially flexible material disposed thereon such that insertion of the plug end 142 into the mouth 114 deforms the flexible material and forms a seal and/or coupling with the interior wall 120 of the neck 108.

The graspable portion 144 of the stopper 106 provides a surface by which the stopper 106 may be handled and manipulated by a user to remove or insert the stopper 106 into the container 100 mouth 114. The graspable portion 144 includes any desired features and/or ornamentation. Additionally, a shoulder 146 is provided adjacent to the plug end 142 of the stopper 106 to obstruct further passage of the stopper 106 into the container 100 and to provide a gripping feature for the stopper 106.

The stopper 106 may be manufactured from a glass, plastic, metal, ceramic, cork, wood, or other similar material or combination thereof. The stopper 106 is generally transparent or translucent and may have one or more portions that are opaque. Additionally, one or more labels, images, decorations, or other features may be applied to an exterior or interior surface thereof using adhesives, printing, painting, etching, or other process. Or, such features might be formed integral with the stopper 106.

With additional reference now to FIGS. 7-10, a sensor 200 for detection of the presence or insertion of the stopper 106 in the mouth 114 of the container 100 is described in accordance with an embodiment of the invention. The sensor 200 includes a flexible substrate 202 upon which two electrically conductive traces 204, 206 are disposed. The sensor 200 is disposed on the interior wall 120 of the neck 108 of the container 100 such that insertion of the stopper 106 is detected by the sensor 200. The substrate 202, and the traces 204, 206 disposed thereon, extend from the sensor 200 on the interior wall 120 of the container 100 along the interior surface 126 of the wall 128 to the base 104. An electrical coupling (not shown) may be provided for connecting the traces 204, 206 to a control circuit disposed within the base 104.

In an embodiment, the substrate 202 and the traces 204, 206 extend from the sensor 200 to the base 104 by a direct route, e.g. straight line, as depicted in FIGS. 1-6. However, the substrate 202 and the traces 204, 206 may take any desired path from the sensor 200 to the base 104. For example, the substrate 202 and the traces 204, 206 might take a curved path that follows an ornamentation applied to the exterior surface 124 of the container 100 or the trace 204 might take a different path than the trace 206. Any such configuration is useable in embodiments of the invention in an effort to conceal the presence of the traces and/or provide ornamentation and is included in the scope described herein.

The flexible substrate 202 may be cut, such as by die cutting, from a sheet or otherwise formed from plastics, polyesters, polyethylene terephthalate (PET), polyethylene naphthalate (PEN), or similar materials. Additionally, one or more layers of non-conductive, dielectric materials might be disposed on the substrate 202 under and/or overlying the traces 204, 206.

The traces 204, 206 are disposed on the substrate 202 by any available means including, for example, screen printing or vapor deposition, among others. The traces 204, 206 are composed of any desired materials that are capable of conducting an electrical signal. Such materials might include silver, silver inks, silver chloride ink, carbon ink, copper, aluminum, and the like. In an embodiment, the materials comprising the substrate 202 and/or the traces 204, 206 are configured to provide a desired coloration. The traces 204, 206 each provide a lead for an open electrical circuit that is electrically coupled to a control circuit disposed in the base 104.

Figure 8:
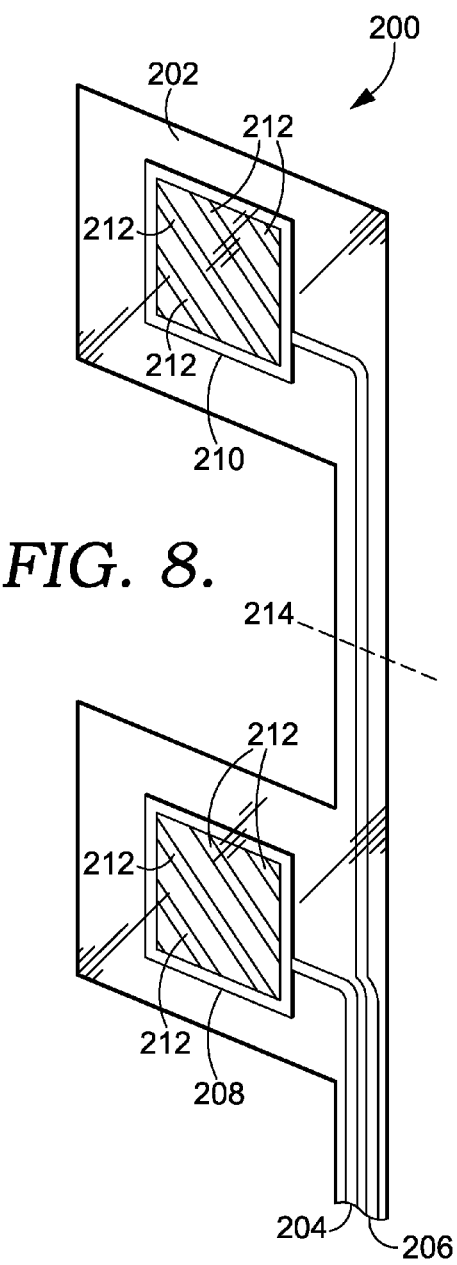
FIG. 8 is a perspective view of the sensor of FIG. 7 depicted in an unfolded configuration in accordance with an embodiment of the invention.

The traces 204, 206 are configured on the substrate 202 to provide first and second arrays 208, 210, respectively. The arrays 208, 210, in the illustrated embodiment, each include a plurality of parallel conductors 212, as best depicted in FIG. 8. The substrate 202 is further configured to be folded along a line 214 (FIG. 8) to bring the first and second arrays 208, 210 into opposition and to cause their parallel conductors 212 to cross in generally perpendicular directions, as depicted best in FIG. 7. As such, contact between the conductors 212 of the first array 208 and the conductors 212 of the second array 210 completes the electrical circuit. It is to be understood that although a particular configuration of the arrays 208, 210 is described herein, a variety of other configurations are suitable for use in embodiments of the invention without departing from the scope described herein and are incorporated herein by reference.

With additional reference to FIG. 9, in one embodiment, a spacer 216 is disposed between the first and second arrays 208, 210. The spacer 216 is formed from a non-conductive material and may be disposed on the first or second array 208, 210, on both arrays, or inserted between the arrays when placed in opposition. The spacer 216 provides sufficient thickness to maintain a spaced relationship (and thereby an open circuit) between the first and second arrays 208, 210 when in a normal state, e.g. when the stopper 106 is removed from the container 100, as described more fully below. The thickness of the spacer 216 is also thin enough to allow at least a portion of the first and second arrays 208, 210 to be pressed into contact, for example when the stopper 106 is inserted into the container 100. The spacer 216 may also be flexible or compressible to allow the first and second arrays 208, 210 to be pressed together.

Referring now to FIG. 10, and in another embodiment, a portion 218 of the substrate 202 associated with the second array 210 is biased into a domed or arched configuration when the first and second arrays 208, 210 are placed in opposition. The domed configuration biases the second array 210 away from the first array 208 to maintain an open circuit when in a normal state. The flexibility of the substrate 202, however, enables the domed configuration to be at least partially flattened or inverted such that at least a portion of the second array 210 is pressed into contact with the first array 208 when, for example, the stopper 106 is inserted into the container 100, thereby completing or closing the circuit. Upon relieving the pressure on the portion 218 of the substrate 202, the portion 218 resumes the domed configuration and the circuit is again opened.

Figure 16:
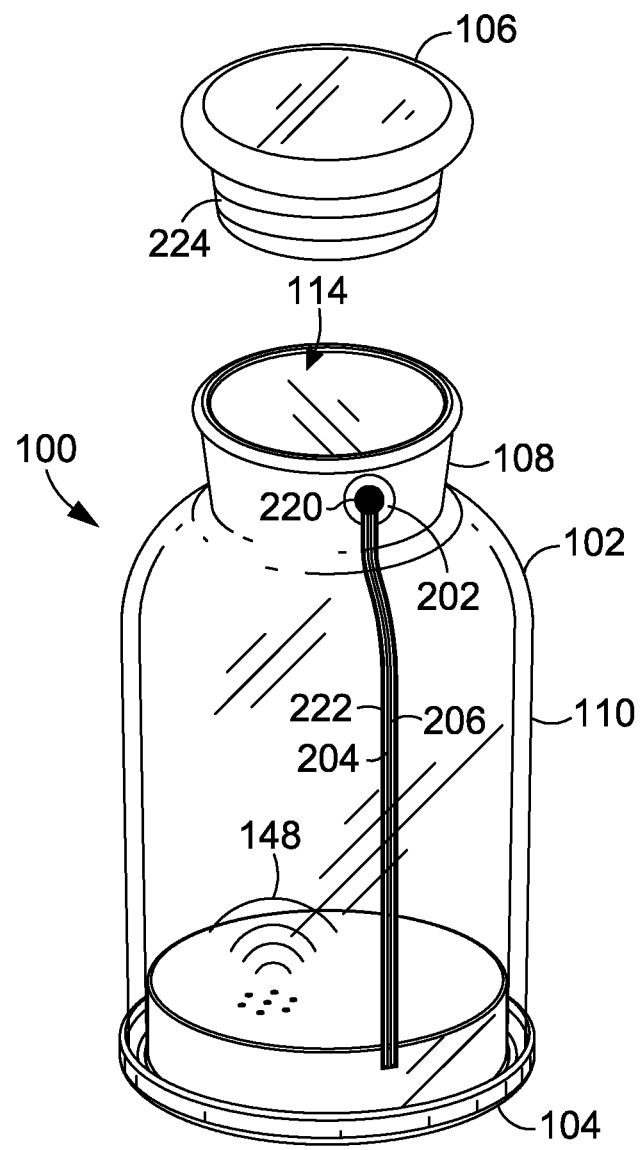
FIG. 16 is a perspective view of the container of FIG. 1 depicting an alternative sensor in accordance with an embodiment of the invention.

In another embodiment, a sensor 220 which detects the presence and/or absence of a magnetic field may be used. One example of such a sensor 220 is a Hall effect sensor or switch that detects the presence and/or absence of a magnetic field, as depicted in FIG. 16. Similar to the sensor 200 above, the sensor 220 may be disposed between portions of the substrate 202 when folded along the line 214 or the sensor 220 may be disposed within or on a single layer of the substrate 202. The sensor 220 may also be directly mounted on the container 100 or integrated therein. The sensor 220 is mounted on the substrate 202 and may be coated with, for example, an epoxy in a manner similar to that used for integrated circuit chips found on printed circuit boards. The substrate 202 and/or the sensor 220 may also be coated to further conceal the sensor 220 and to provide a pleasing aesthetic appearance. When a Hall effect sensor is used as the sensor 220, a third trace 222 similar to the traces 204 and 206 may be provided to carry the sensor signal and/or to provide power to the sensor 220. Another example of such a magnetic sensor 220 would be a reed switch. As known in the art, a reed switch includes a pair of metal contacts normally spaced apart. The presence of a magnetic field draws the contacts together and completes a circuit.

When using a magnetic sensor 220, the stopper 106 is provided with a magnetic feature 224. The magnetic feature 224 may be provided by constructing the stopper 106 from a magnetic material or by attaching or integrating the magnetic feature 224 in the stopper 106. In one embodiment, such as the exemplary embodiment illustrated in FIG. 16, a magnetic ring 224 is disposed around a surface of the stopper 106 to trigger the sensor 220 when the stopper 106 is inserted into the mouth 114 of the container 100. In another embodiment, the magnetic feature 224 may be placed inside the stopper 106.

Turning back to FIGS. 1-10, operation of the container 100 is described in accordance with an embodiment of the invention. Initially, the container 100 is provided with the stopper 106 inserted into the mouth 114. As such, the stopper 106 is in contact with the sensor 200 causing the first and second arrays 208, 210 to be pressed into contact, thus, forming a closed circuit. Subsequently, a user removes the stopper 106 from the container 100 by grasping the graspable portion 144 of the stopper 106 and pulling the stopper 106 outwardly from the mouth 114 of the container 100.

As the stopper 106 is removed, pressure applied by the stopper 106 on the sensor 200 is relieved, whereby the first and second arrays 208, 210 resume a spaced apart configuration provided by the spacer 216 or the domed configuration described above with respect to FIGS. 9 and 10. The spaced apart configuration provides an open circuit that is detected by the control circuitry housed in the base 104. As a result, the control circuit causes an audible output 148 to be produced by the speaker, as depicted in FIG. 3. The audible output 138 may include a pre-recorded message, a song, or other audio content.

The speaker's configuration within the base 104 directs the audible output 138 into the interior or cavity of the hollow body 102 of the container 100 and out the mouth 114. Such configuration may provide unique acoustical qualities to the audible output 138 and a unique auditory experience for persons adjacent or within an audible range of the container 100.

While the stopper 106 remains removed from the container 100, the audible output 138 continues for the duration of the data file from which it is produced and then ceases or may be repeated continuously. Alternatively, one or more second data files might be subsequently played following completion of the first data file.

Additionally, while the stopper 106 is removed, a user may insert one or more desired items into the container 100. The items may be inserted for display, safekeeping, or any other desired reason. In an embodiment, the items may be dry items, such as keepsakes, mementos, souvenirs, pictures, notes, scrolls, or the like. In another embodiment, the container 100 including the base 104 and the speaker disposed therein are sealed and configured to be resistant to liquids. As such, one or more liquids, or other items that might normally clog or damage the speaker, such as sand, rocks and/or soil, might be disposed in the container 100.

At any time during playback of the audible output 148, or subsequent thereto, the user reinserts the stopper 106 into the mouth 114. Doing so again compresses the sensor 200 to close the circuit. The control unit detects closure of the circuit and ceases playback of the audible output. Upon a next removal of the stopper 106 the audible output begins again at the beginning of the data file, at the point at which the stopper 106 was previously replaced, or a subsequent data file is played.

With reference now to FIGS. 11-15, a container 300 configured to generate an audible output interior to the container that is perceivable by users exterior to the container is described in accordance with another embodiment of the invention. The container 300 includes features similar to those described above with respect to the container 100. Accordingly, similar components of the container 300 are provided reference numerals having the same second and third digits as those described for the container 100.

Figure 15:
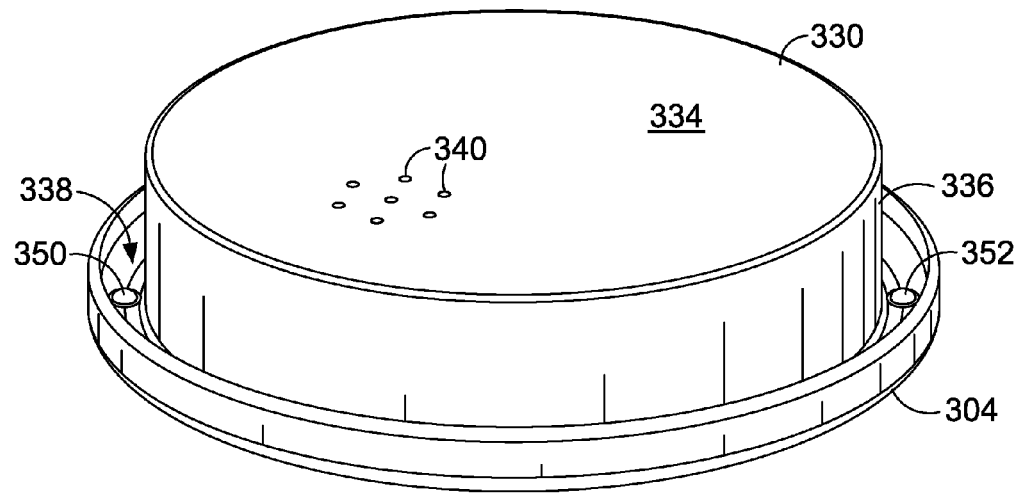
FIG. 15 is a perspective view of one possible embodiment of a base for use with a container in accordance with the invention.

The container 300 includes a body 302, a base 304, and a stopper 306 as described above. The base 304 in this embodiment, however, includes an infrared light source (IR source) 350 and an infrared light sensor or detector (IR detector) 352. Embodiments of the invention are described herein with respect to an infrared light source, however, any light source and comparable detector are useable in embodiments of the invention. The IR source 350 is disposed within the channel 338 of the base 304 and oriented to direct IR light emitted therefrom into the edge 322 of the body 302. The IR detector 352 is similarly disposed within the channel 338 away from the IR source 350 and oriented to receive IR light from within the wall 328. The IR source 350 and the IR detector 352 may be disposed at opposite sides of the base 304, as depicted in FIG. 15, or, in alternate embodiments, they may be disposed at any desired location along the edge 322.

Accordingly, the IR source 350 emits IR light into the wall 328 of the body 302. The IR light is at least partially internally reflected within the wall 328 and travels along the body 302 to the neck 308, as depicted in FIG. 11 by rays 354. With the stopper 306 inserted into the container 300 mouth 314, the IR light is at least partially reflected from a point of incidence in the neck 308 back along the body 302 toward the base 304. The reflected IR light is subsequently received and detected by the IR detector 352.

Figure 12:
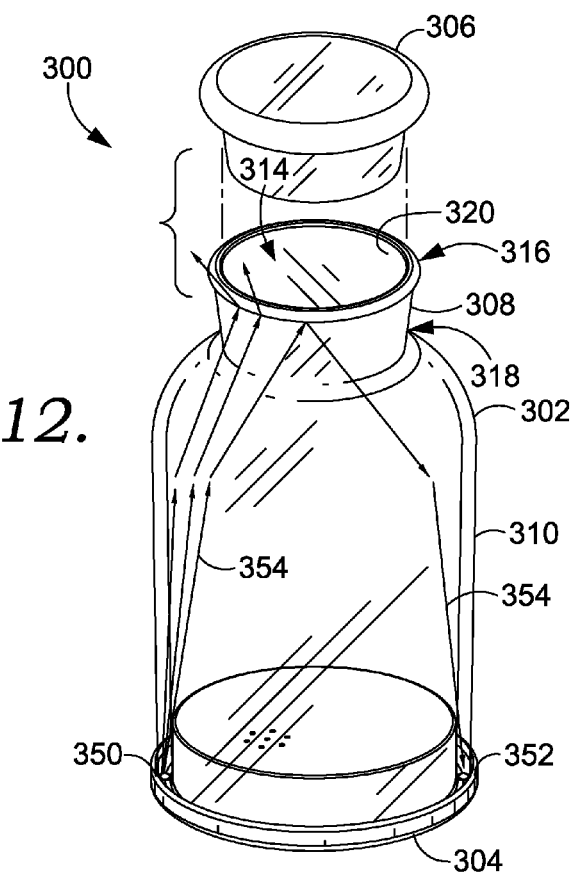
FIG. 12 is a perspective view depicting the container of FIG. 11 with a stopper removed.

Detection of at least a pre-determined amount or intensity of IR light by the IR detector 352 is indicative of the stopper 306 being present or inserted in the container 300. Upon removal of the stopper 306 from the container 300, as depicted in FIG. 12, a decreased amount or intensity of IR light is detected by the IR detector 352. Thereby, the control circuitry employs the amount of IR light detected to determine when to cause or cease production of the audible output as described previously above.

Figure 13:
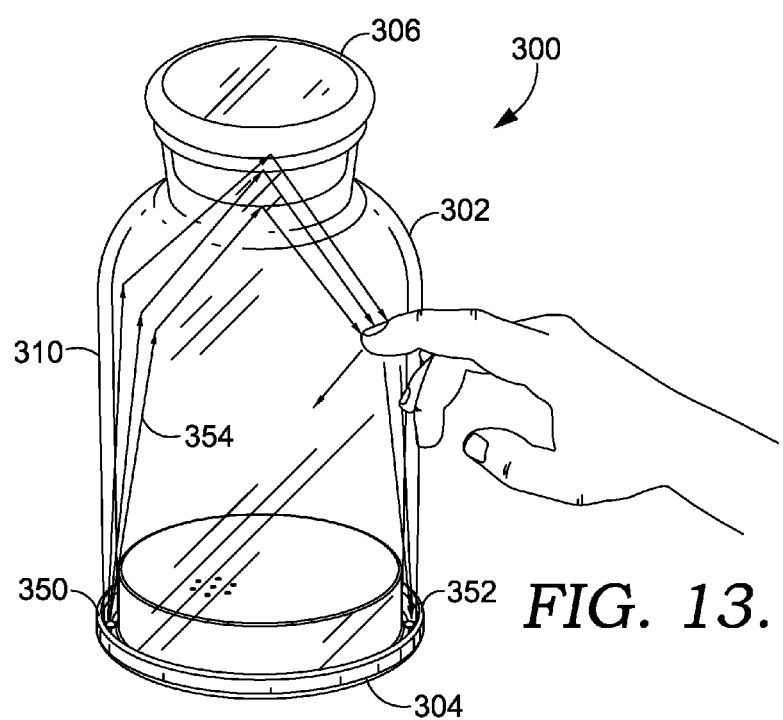
FIG. 13 is a perspective view of the container of FIG. 11 depicting exemplary paths of light when the container is touched by a user.
Figure 14:
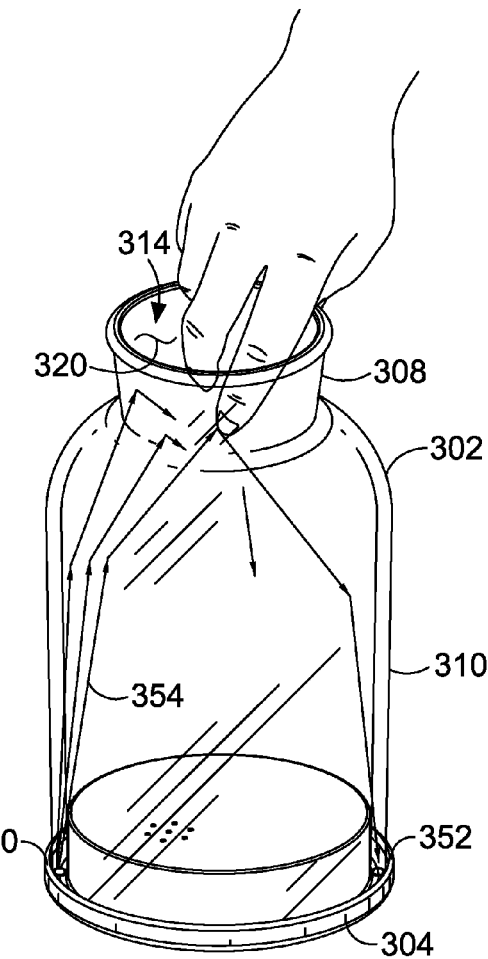
FIG. 14 is a perspective view of the container of FIG. 11 depicting exemplary paths of light when an interior surface of the container is touched by a user.

In an embodiment, the pre-determined amount or intensity of IR light necessary to indicate presence or removal of the stopper 306 is configured to account for variations caused by objects contacting the container 300. For example, as depicted in FIGS. 13 and 14, a user touching the exterior (FIG. 13) or interior (FIG. 14) of the container might provide a reflective point that increases the amount or intensity of IR light received by the IR detector 352. Alternatively, a user touching the container 300 might create a point of outcoupling of the IR light, thus reducing the amount of IR light detected.

Additionally, in an embodiment, the stopper 306 includes one or more reflective features that increase reflection of IR light toward the IR detector 352. For example, the plug end 342 or under side of the stopper 306 might include a shiny coating or metalized layer to increase reflectivity. Alternatively, the plug end 342 or under side of the stopper 306 might include a white paint or coating as another means to reflect the IR light. The stopper 306 and the neck 308 might also include one or more features, such as one or more faces configured to provide highly reflective angles of incidence, or the like.

Reflection of the IR light occurs at any location along the neck 308 and/or the stopper 306. The stopper 306 and neck 308 may be designed to provide one or more specific areas of increased reflectivity. For example, the shoulder 346 of the stopper 306 and the first end 316 of the neck 308 might be configured to provide a close contact surface with increased reflective properties. Alternatively, the plug end 342 and the interior wall 320 of the neck might be configured to provide increased reflective properties.

In some embodiments, the IR source 350 emits IR light continuously and the IR detector 352 detects the amount of IR light received continuously. In alternate embodiments, the IR source and detector 250, 352 use short pulses of light in a distinct pattern/sequence. This allows for a reduction in overall power consumption, since the IR source and detector 250, 352 are not continuously "on," and a reduction in the amount of interference from IR artifacts in ambient room light.

The IR detector 352 may also be used with various filters to filter out light that is outside of a specific, narrow wavelength band. This helps to reduce interference from other light sources and false activations.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A container comprising:
a hollow body having an open mouth forming an aperture and an open bottom end;
a base configured to be received by the bottom end of the body, the base including a first and a second surface, the first surface facing an interior of the body and the second surface facing opposite the first surface, the base having a speaker disposed between the first and second surfaces and directed through the first surface into the interior of the body;
a stopper configured to be removeably received in the open mouth of the body to enclose the interior of the body;
a sensor configured to detect presence of the stopper within the mouth of the body,
wherein the sensor detects one of removal of the stopper from the mouth of the body, whereby the speaker generates an audible output, and the sensor detects insertion of the stopper within the mouth of the body, whereby the audible output ceases.

2. The container of claim 1, wherein the sensor further comprises:
a first electrically conductive array disposed on an interior surface of the mouth of the body; and
a second electrically conductive array disposed in the mouth of the body overlying the first array, the second array being biased to provide a spaced apart, open-circuit configuration between the first and second arrays;
wherein the stopper contacts the second array when the stopper is inserted into the mouth of the body causing at least a portion of the second array to be pressed into contact with the first array to complete an electrical circuit.

3. The container of claim 2, wherein the first array includes a plurality of first conductors arranged in a first orientation and the second array includes a plurality of second conductors arranged in a second orientation which cross the first conductors in the first orientation.

4. The container of claim 2, wherein the first array is coupled to a control circuit disposed within the base by a first electrically conductive trace, wherein the second array is coupled to the control circuit by a second electrically conductive trace, and wherein the first and second traces are disposed on an interior surface of the body.

5. The container of claim 4, wherein the first and second traces are arranged to correspond with a decoration applied to one or more of the interior of the body, an exterior of the body, and internally to a wall of the body.

6. The container of claim 4, wherein the first and second arrays and the first and second traces are disposed on a flexible substrate that is attached to the body.

7. The container of claim 6, wherein the second array is biased away from the first array by configuring the flexible substrate on which the second array is disposed in a dome-like arrangement over the first array.

8. The container of claim 2, wherein the second array is biased away from the first array by a spacer intermediate the first and second arrays.

9. The container of claim 1, wherein the sensor further comprises:
an infrared light source disposed in the base and configured to emit infrared light into a wall of the body, the infrared light at least partially reflected through the wall by internal reflection; and
an infrared light detector disposed in the base and configured to receive infrared light emitted by the source into the wall of the body;
wherein infrared light from the source is received by the detector in a first amount when the stopper is received in the mouth of the body, and wherein infrared light from the source is received by the detector in a second amount different from the first amount when the stopper is removed from the mouth of the body.

10. The container of claim 9, wherein the source is located along an edge of the bottom end of the body, wherein the detector is located along the edge of the bottom end of the body, and wherein the source and the detector are circumferentially spaced apart from one another.

11. The container of claim 9, wherein a reflective material is disposed on a surface of the stopper.

12. The container of claim 1, wherein the base includes one or more of control electronics, a memory, a processor, a power source, a switch, a microphone, and a record button.

13. The container of claim 1, wherein the sensor is a magnetic sensor that detects a presence of a magnetic field and wherein the stopper includes a magnetic feature disposed thereon or integrated therein.

14. The container of claim 1, wherein the body is configured to enhance acoustical properties.

15. The container of claim 1, wherein the audible output is one or more of a pre-recorded audio file and a user-recorded audio file.

16. A container comprising:
a hollow body having an open mouth forming an aperture and an open bottom end;
a base received in the bottom end of the body, the base including a first and a second surface, the first surface facing an interior of the body and the second surface facing opposite the first surface, the base having a speaker directed through the first surface into the interior of the body;
a stopper configured to be removeably received in the open mouth of the body; and
a sensor disposed on an interior surface of the mouth of the body and configured to detect presence of the stopper within the mouth of the body, the sensor including a flexible substrate with a first and a second electrically conductive array disposed thereon and configured to place the first and second arrays in opposition and in a normally spaced apart orientation with the second array being biased apart from the first array to provide a normally open circuit between the first and second arrays.

17. The container of claim 16, wherein when the stopper is removed from the mouth of the body the first and second arrays provide the open circuit, wherein detection of the open circuit by a control unit causes the speaker to generate an audible output, wherein receipt of the stopper in the mouth of the body causes the stopper to contact the sensor and thereby cause at least a portion of the second array to be pressed into contact with the first array to provide a closed electrical circuit, wherein detection of the closed circuit causes the control unit to terminate the audible output.

18. The container of claim 16, wherein the second array is biased away from the first array by a spacer intermediate the first and second arrays.

19. A container comprising:
   a hollow body having an open mouth forming an aperture and an open bottom end;
   a base received in the bottom end of the body, the base including first and a second oppositely facing surfaces and having a speaker therein oriented to direct output therefrom through the first surface and into an interior of the body;
   a stopper configured to be removeably received in the open mouth of the body;
   an infrared light source disposed in the base and configured to emit infrared light into a wall of the body; and
   an infrared light detector disposed in the base and configured to receive infrared light emitted by the source into the wall of the body, wherein at least a portion of the infrared light is reflected through the wall by internal reflection.

20. The container of claim 19, wherein infrared light from the source is received by the detector in a first amount when the stopper is received into the mouth of the body, wherein infrared light from the source is received by the detector in a second amount different from the first amount when the stopper is not received in the mouth of the body, and wherein the speaker generates an audible output up detection of removal of the stopper from the mouth of the body.

* * * * *